No. 890,004. PATENTED JUNE 9, 1908.
J. C. WISE.
SPOKE FOR VEHICLE WHEELS.
APPLICATION FILED SEPT. 23, 1907.
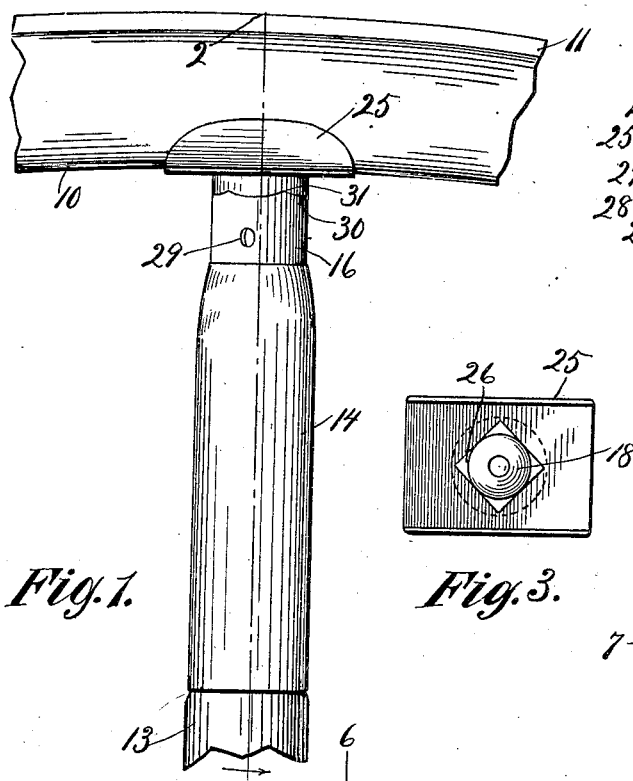
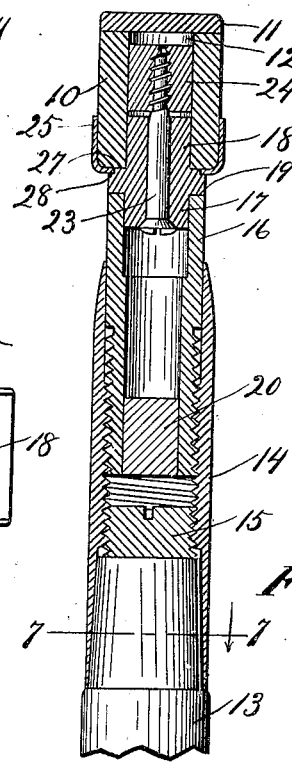
Fig. 1. Fig. 3. Fig. 2.
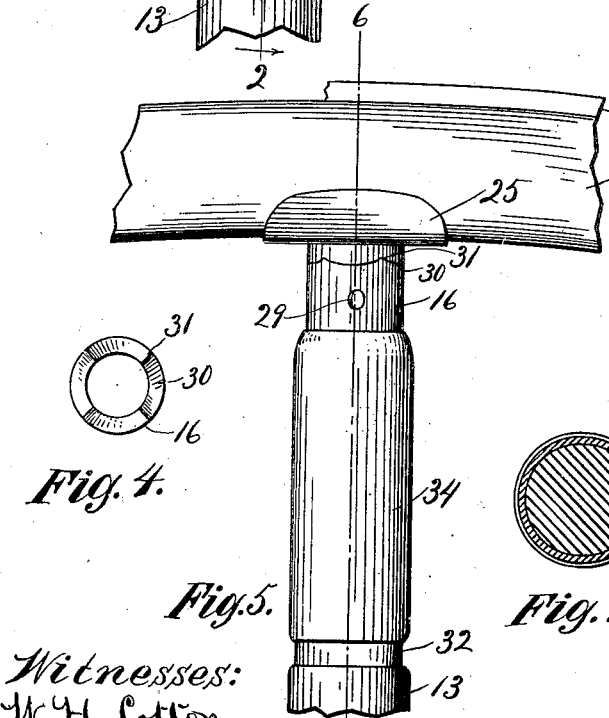
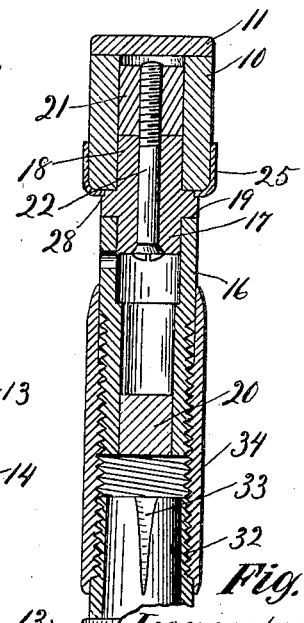
Fig. 4. Fig. 5. Fig. 7. Fig. 6.
Witnesses:
W. H. Cotton
Charles B. Gilson
Inventor:
Joseph Cooper Wise.
By Louis K. Gleeson Atty.

UNITED STATES PATENT OFFICE.

JOSEPH COOPER WISE, OF HILLSBORO, IOWA.

SPOKE FOR VEHICLE-WHEELS.

No. 890,004.        Specification of Letters Patent.        Patented June 9, 1908.

Application filed September 23, 1907. Serial No. 394,191.

*To all whom it may concern:*

Be it known that I, JOSEPH COOPER WISE, a citizen of the United States, and resident of Hillsboro, county of Henry, and State of Iowa, have invented certain new and useful Improvements in Spokes for Vehicle-Wheels, of which the following is a specification, and which are illustrated in the accompanying drawings, forming a part thereof.

The invention relates to the spokes of vehicle wheels, and more particularly to those of such wheels as comprise a sectional or elastic felly inclosed by a metal rim or tire.

The objects of the invention are to provide means of simple and improved construction for rendering the spokes of vehicle wheels adjustably extensible in length, whereby the felly of the wheel may be forcibly expanded within the tire or rim for securing the latter in place, and to provide for the easy and efficient repair of broken vehicle spokes.

The invention is exemplified in the structures to be hereinafter described and illustrated in the accompanying drawings, in which,—

Figure 1 is a detail side elevation of a vehicle wheel having a spoke constructed in accordance with the invention; Fig. 2 is a sectional view taken on the line 2—2 of Fig. 1; Figs. 3 and 4 illustrate in plan view details of the construction separated from other parts; Fig. 5 is a detail side elevation of a vehicle wheel having a slightly modified form of spoke; Fig. 6 is a sectional view taken on the line 6—6 of Fig. 5; and Fig. 7 is a detail, plan sectional view taken on the line 7—7 of Fig. 2.

A detail of the felly of the vehicle wheel is shown in the drawings at 10, the encircling tire being designated 11. In carrying out the invention, the felly 10 is provided with the usual mortise 12, and a spoke 13 is provided, which is of usual construction except that it is of reduced length, either by reason of its having been fractured in service and thereafter cut to a suitable length to receive the apparatus provided by the invention, which is then applied to the spoke for the purpose of effecting a repair of the same, or because it has been purposely so made in the manufacture of the wheel, the apparatus provided by the invention being in that event applied to the spoke section 13 for the purpose of rendering the same adjustably extensible in length, in order that the felly 10 may be forcibly expanded within the tire 11 for securing the latter in place.

A socketed member 14 is applied to the outer end of the spoke section 13. As shown, this socketed member takes the form of an internally-threaded sleeve, a socket of adjustable depth being provided at one end of the sleeve for receiving the end of the spoke section by means of a shoe or screw plug 15, which is threaded in order that it may assume any adjusted position within the sleeve, and is designed to bear upon the end of the spoke section 13. By reason of this adjustability of the screw plug or shoe 15 within the member 14, the latter may be made to assume the required position with respect to the felly 10 of the wheel without it being necessary to employ great accuracy in cutting the spoke section 13 to any particular length. A bolt 16 having a threaded engagement with the member 14 extends beyond the latter toward the felly of the wheel, and has its outer end provided with a socket for receiving the head 17 of a plug 18 designed to enter the mortise 12 of the felly, and provided with an annular shoulder 19 adjacent to its head 17, which forms a thrust bearing for the bolt 16. The socket at the end of the bolt 16 for receiving the head 17 of the plug 18 is conveniently provided by making the bolt 16 of tubular form, the inner end of the tube being then preferably closed by a plug 20 to prevent dirt from entering the interior of the socketed member 14. As shown in Fig. 6, the shank portion of the plug 18 is made sectional, the outer section 21 being removably united to the body of the plug by a machine screw 22. When the device is to be employed for the repair of a broken vehicle spoke, as shown in Figs. 1 and 2, the outer section 21 of the plug 18 is removed, and the machine screw 22 is replaced by a screw 23 adapted to enter a portion 24 of the tenon of the broken vehicle spoke, which is preferably allowed to remain in the mortise 12 for that purpose.

Preferably, a felly plate 25 is applied to the felly 10 adjacent to the mortise 12, and, as most clearly shown in Fig. 3, this felly plate has a squared opening 26 adapted to receive a correspondingly-shaped portion 27 of the plug 18 for the purpose of preventing rotation of the latter. Adjacent to the squared portion 27, the plug 18 is provided with a shoulder 28 designed to bear upon the felly plate 25 and transmit the thrust of the bolt 16 to the felly 10. The outer end of the bolt 16 is suitably formed to receive a tool for effecting its rotation. Most conveniently, it is provided with a radially directed socket 29 for receiving a key, not shown. Rotation of the socketed member 14 is prevented by reason of the socket at its inner end being of elliptical cross section, as most clearly shown in Fig. 7, and corresponding to the usual form of vehicle spokes.

In use, the socketed member 14 will be applied to the outer end of the spoke section 13, the shoe 15 for engaging the outer end of the spoke section being suitably adjusted within the member 14 to bring the latter in the desired relation to the felly 10 of the wheel. The felly plate 25 and bearing plug 18 may then be placed in position and the bolt 16 rotated by means of a key inserted in the socket 29 to forcibly engage the bearing surface 19 of the plug 18. To prevent the device from becoming loosened by the rattle of the vehicle, a counter rotation of the bolt 16 is prevented by providing the bearing surface 19 of the plug 18 and the head of the bolt 16 with intercalating, rounded, elevated and depressed portions 30 and 31, most clearly shown in Figs. 1 and 4.

When the device is to be used in connection with the original manufacture of vehicle wheels, for the purpose of rendering the spokes of the wheels adjustably extensible in length, it will preferably take the form illustrated in Figs. 5 and 6, wherein an externally-threaded ferrule 32 is permanently secured to the outer end of the spoke section 13 by means of a wedge 33, and a threaded bearing is provided for the bolt 16 in a sleeve 34, for the inner end of which the ferrule 32 provides a permanent seat.

I claim as my invention:

1. In an apparatus for repairing a vehicle wheel having a severed spoke, in combination, a sleeve for covering the end of the spoke, a shoe engageable with the end of the spoke adjustably mounted with the sleeve, and an expanding bolt adapted to react between the sleeve and the felly of the wheel.

2. In combination, an internally threaded sleeve, a screw plug running in the sleeve and forming with the wall of the sleeve adjacent to one end thereof a socket of adjustable depth, and a rotatable screw bolt projecting from the farther end of the sleeve, for the purpose set forth.

3. In a wheel comprising a spoke and a mortised felly, in combination, a socketed member engageable with the end of the spoke, an expanding bolt carried by such member, a plug engageable with a mortise in the felly and providing a thrust bearing for the bolt, the contacting surfaces of the plug and the bolt being provided respectively with intercalating elevated and depressed portions adapted to yieldingly lock such members against relative rotation, means for preventing rotation of the plug, and means for preventing rotation of the socketed member.

4. In a wheel comprising a spoke and a mortised felly, in combination, a socketed member engageable with the end of the spoke, an expanding bolt carried by such member, a plug engageable with a mortise in the felly and providing a thrust bearing for the bolt, and a felly plate adapted to prevent rotation of the plug and to receive the thrust of the bolt.

5. In a wheel comprising a spoke and a mortised felly, in combination, a socketed member engageable with the end of the spoke, an expanding bolt carried by such member, a felly plate, and a plug entering a mortise in the felly through an aperture in the plate, such plug providing a thrust bearing for the bolt and having a shoulder bearing on the felly plate and being fixed against rotation in the plate.

6. In a wheel comprising a spoke and a mortised felly, in combination, a socketed member engageable with the end of the spoke, an expanding bolt carried by such member, a felly plate, a plug entering a mortise in the felly through an aperture in the plate, such plug providing a thrust bearing on the felly plate, and a screw entering the felly through the plug.

JOSEPH COOPER WISE.

Witnesses:
W. L. COPELAND,
A. J. SCHULTZ.